United States Patent [19]

Akagiri

[11] Patent Number: 5,553,193
[45] Date of Patent: Sep. 3, 1996

[54] BIT ALLOCATION METHOD AND DEVICE FOR DIGITAL AUDIO SIGNALS USING AURAL CHARACTERISTICS AND SIGNAL INTENSITIES

[75] Inventor: Kenzo Akagiri, Kanagawa, Japan

[73] Assignee: Sony Corporation, Tokyo, Japan

[21] Appl. No.: 56,193

[22] Filed: May 3, 1993

[30] Foreign Application Priority Data

May 7, 1992 [JP] Japan .................................. 4-141103

[51] Int. Cl.⁶ .................. G10L 3/02; G10L 9/00
[52] U.S. Cl. ............. 395/2.38; 395/225; 395/2.39; 395/2.43
[58] Field of Search ................. 395/2.38, 2.39, 395/2.43, 2.25; 375/1

[56] References Cited

U.S. PATENT DOCUMENTS

| | | | |
|---|---|---|---|
| 4,485,337 | 11/1984 | Sandusky | 318/314 |
| 4,669,120 | 5/1987 | Ono | 395/2.25 |
| 4,908,810 | 3/1990 | Oie | 369/50 |
| 4,972,484 | 11/1990 | Theile | 395/2.36 |
| 5,040,217 | 8/1991 | Brandenburg | 395/2.35 |
| 5,045,812 | 9/1991 | Tateishi | 331/10 |
| 5,109,417 | 5/1992 | Fielder | 381/36 |
| 5,204,677 | 4/1993 | Akagiri et al. | 341/118 |
| 5,301,205 | 4/1994 | Tsutsui et al. | 375/200 |
| 5,311,561 | 5/1994 | Akagiri | 375/240 |

FOREIGN PATENT DOCUMENTS

3933974A1  4/1990  Germany  .............. G11B 19/247

OTHER PUBLICATIONS

Patent Abstract of Japan, vol. 14, No. 525 (P-1132) 19 Nov. 1990 & JP-A-22 20 271 (Pioneer Electronic Corporation) 3 Sep. 1990 *abstract*.

*Primary Examiner*—Allen R. MacDonald
*Assistant Examiner*—Indranil Chowdhury
*Attorney, Agent, or Firm*—Limbach & Limbach L.L.P.

[57] ABSTRACT

A method for compression encoding of digital speech signals in which the digital speech signals are divided at a predetermined time interval into plural frequency bands so as to be sub-divided along both the time scale and the frequency scale to form plural sub-blocks, and data encoding is performed using an allocation bit number determined for each of said sub-blocks. The total number of bits that may be used for bit allocation is divided into at least two portions, with the bits of one of these portions being allocated in dependence upon the allowable noise level based on aural characteristics and with the bits of the remaining portion being allocated in dependence upon the intensities of signals in each sub-block. The number of bits allocated to each of the small-sized sub-blocks are determined by the sum of the bits of the two portions. In addition to the total number of bits that may be used for bit allocation, a number of bits is also set for the subsidiary information at least including the floating information and the bit length information. The aural characteristics are combined from at least the masking threshold and the minimum audibility curve and corrected by the equal-loudness curve.

19 Claims, 9 Drawing Sheets

BIT ALLOCATION METHOD AND DEVICE FOR DIGITAL AUDIO SIGNALS USING AURAL CHARACTERISTICS AND SIGNAL INTENSITIES

BACKGROUND OF THE INVENTION

1. Field of the Invention

This invention relates to a method and a device for high efficiency compression and expansion of digital audio signals, that is, a method and a device for compressing the digital audio signal by high efficiency encoding, transmitting or recording the compressed signal on a recording medium and expanding the transmitted or recorded signal.

2. Description of the Related Art

There are a variety of methods known for high efficiency encoding of audio signals to effect compression. For example, sub-band coding (SBC) is known. Sub-band coding is a form of a non-time-block-forming frequency band dividing system in which an audio signal in the time domain is divided into plural frequency ranges in which the signal is encoded without being divided in time into blocks.

Among the prior-art techniques known to the present inventors, there are U.S. Pat. Nos. 4,972,484 and 5,109,417 which disclose a bit allocation method responsive to the input signal. However, in these prior-art methods, bit allocation is achieved in a manner dependent solely on the energy of the input signal.

There is also known a time-block-forming, frequency-band-dividing system, or a transform encoding system, in which the digital audio signal in the time domain is divided in time into blocks, and each block is orthogonally transformed to generate spectral components in the frequency domain. The spectral components resulting from transforming each block are divided into frequency bands in which they are encoded. There is also known a high efficiency encoding method which consists of a combination of sub-band coding and transform coding. With this method, the audio signal in the time domain is divided into plural frequency ranges by SBC, and the resulting signals in the respective frequency ranges are divided in time into blocks, and each block is orthogonally transformed to generate spectral components in the frequency domain. The spectral components resulting from transforming each block are divided into frequency bands in which they are encoded.

An example of the filters useful for dividing a digital audio input signal in the time domain into frequency ranges is the quadrature mirror filter (QMF), which is described in detail in R. E. Crochiere, *Digital Coding of Speech in Sub-bands,* BELL SYST. TECH. J., Vol. 55, No. 8, 1976.

The technique of dividing the digital audio input signal in frequency into frequency ranges of an equal width is discussed in Joseph H. Rothweiler, *Polyphase Quadrature Filers-a New Sub-band Coding Technique,* ICASSP 83, BOSTON (1983)

In performing the above-mentioned orthogonal transform, a digital audio input signal is divided into blocks at an interval of a predetermined time period called a frame, and an orthogonal transform is executed on each of the blocks. Examples of the orthogonal transform are the discrete Fourier transform (DFT), the discrete cosine transform (DCT), and the modified discrete cosine transform (MDCT). In all of these transform, a signal in the time domain is transformed into spectral components in the frequency domain. The MDCT is described in J. P. Princen and A. B. Bradley, *Sub-band/Transform Coding Using Filter Bank Designs Based on Time-Domain Aliasing Cancellation,* ICASSP 1987.

The widths of the frequency bands into the spectral components are divided for encoding are set to correspond to critical bands, which take account of the frequency resolution characteristics of the human auditory sense. In this, the audio frequency range is divided into a plurality of, such as 25, bands, so that the bandwidth of the frequency band becomes broader, the higher the frequency of the band.

A bit allocation is made to each frequency band in a predetermined or an adaptive manner to encode the spectral components in the frequency band. For example, the spectral components resulting from the MDCT processing are encoded by an adaptive bit allocation to each frequency band.

The following two adaptive bit allocation methods are known. In IEEE TRANSACTIONS OF ACOUSTIC, SPEECH, AND SIGNAL PROCESSING, vol. ASSP-25, No.4, August 1977, there is shown a technique of allocating bits based on the signal magnitude in each frequency band. With this system, the quantizing noise spectrum is made flat in each frequency range such that the noise energy is minimized. However, this system has a drawback that, since the masking effect of the human auditory sense is not utilized, the noise spectrum is not optimized to minimize its perception by the listener.

To overcome this shortcoming, coefficients known as shaping factors may be utilized at the time of bit allocation decision to adapt the quantizing noise spectrum to the characteristics of the human auditory sense. However, when a sine wave having a frequency of, e.g., 1 kHz, is used for measuring the characteristics of this quantizing method, the allocated bits cannot be sufficiently concentrated at the frequency of the sine wave, and characteristic values as good as desired cannot be obtained.

The masking effect, which is among the characteristics of the human auditory sense, is the effect in which a tone is masked by another tone and is thus rendered inaudible. The masking effect may be classified into the time-domain masking effect and concurrent, frequency-domain masking effect. As a result of the masking effect, noise, if present, that is masked is concealed and cannot be heard. For this reason, the noise in present in an actual audio signal, if within the masking range of the audio signal, is termed an allowable noise.

The time-domain masking effect may also be classified into the forward masking effect and the backward masking effect. The forward masking effect is the effect of a temporally-earlier tone masking a temporally-later tone. Conversely, backward masking is the effect of a temporally-later tone masking a temporally-earlier tone. Backward masking is known to exhibit its masking effect for a markedly shorter time than forward masking.

In M. A. Kransner, *The Critical Band Coder Digital Encoding of the Perceptual Requirements of the Auditory System,* ICASSP 1980, there is disclosed a method of deriving the signal-to-noise ratio required for each band by using auditory masking determining a fixed allocation of bits. This method has the deficiency that, when the characteristics are measured using a sine wave, the measured values are not as good as desired because of the fixed bit allocation.

In this manner, if bits are allocated among the bands based on the signal magnitude in each band to minimize the quantizing noise energies, the noise level perceived by the listener is not minimized. On the other hand, if fixed noise shaping factors are introduced, or if a fixed bit allocation is made to each band in consideration of the masking effect, it is difficult to achieve a satisfactory signal-to-noise characteristics measured using a sine wave.

SUMMARY OF THE INVENTION

In view of the above-depicted state of the art, it is an object of the present invention to provide a high efficiency encoding method and device which are desirable from the viewpoint of the auditory sense and which enables a lone spectrum input, such as a sine wave having a frequency of 1 kHz, to be encoded by bit allocation to obtain optimum signal-to-noise characteristics.

It is another object of the present invention to provide a high efficiency decoding method and device for decoding the compressed signal encoded by the above-mentioned bit allocation.

The present invention provides a high efficiency encoding method and encoder, that is, a signal compression method and encoder, in which a digital audio signal is divided into frames at a predetermined time interval, and each frame is divided into plural frequency bands to form a set of blocks so as to divide the digital audio signal in both time and frequency, and in which compression is performed using a bit allocation number determined for each of the blocks. A total number of bits is divided into at least two portions for bit allocation among the blocks in the set. The at least two portions include a first portion and a second portion. The bits of the first portion are allocated among the blocks dependent on the allowable noise spectrum based on aural characteristics, such as the masking effect, a minimum audibility curve and/or an equal-loudness curve. Respective signal intensities are calculated for the blocks, and the bits of the second portion are allocated among the blocks dependent on the respective signal intensities, that is, the signal energies, calculated for the blocks. The bits of the two portions are combined for each of the blocks to determine the bit allocation number for each of the blocks.

The total number of bits may be divided into an additional portion of a fixed number of bits to be used for representing subsidiary information including block floating information employed in block floating and word length information indicating the bit allocation number for each of the blocks.

With the high efficiency encoding method and encoder of the present invention, the digital audio input signal compressed and encoded using the allocated bits is transmitted over or received via a transmission channel or is recorded on or reproduced from a suitable recording medium for expansion or decoding.

With the high efficiency encoding method of the present invention, the digital audio input signal is divided along the frequency axis without being formed into time blocks and are further divided into predetermined frequency bands for forming the blocks.

According to the present invention, the total number of bits that may be employed for bit allocation to the digital input signal is divided into at least two portions for bit allocation among the blocks. The bits of a first portion are for allocation among the bands dependent on the allowable noise spectrum based on aural characteristics and the bits of a second portion are for allocation among the bands dependent on intensities of the signal in each of the sub-blocks. Consequently, the noise level perceived by the human aural sense may be reduced with input audio signals exhibiting a wide spectral distribution, such as music signals. If the input signal has a spectrum with a large signal level in one frequency range, such as sine wave, part of the bit allocation may be concentrated in this range to improve the S/N ratio.

DESCRIPTION OF THE PREFERRED EMBODIMENTS

Figure 1:
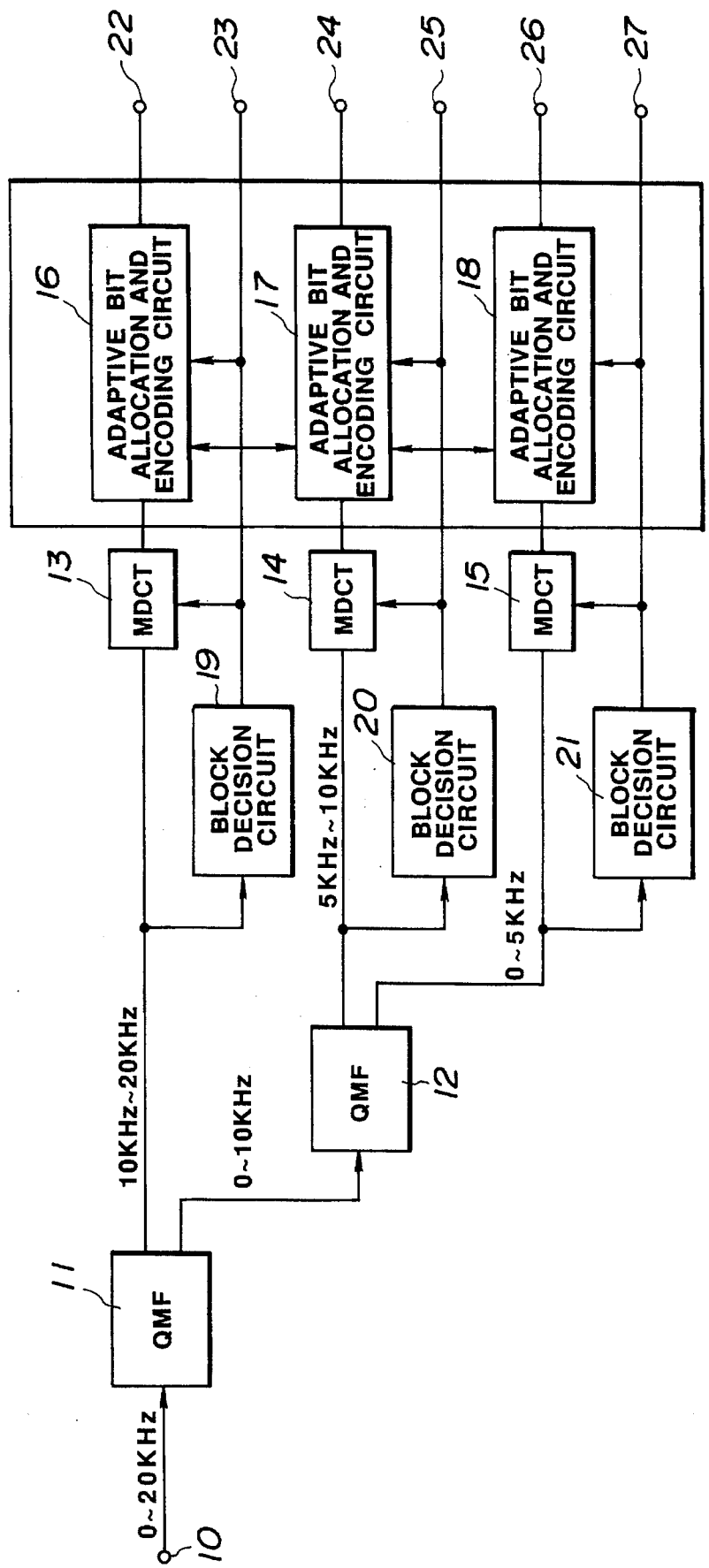
FIG. 1 is a block circuit diagram showing an example of a signal compressor using a high efficiency encoder embodying the present invention.

Referring to the drawings, preferred embodiments of the signal compression encoder of the present invention will be described in detail.

FIG. 1 shows a high efficiency encoder as a data compression device embodying the present invention. The high efficiency encoding device is adapted for encoding a digital input signal, such as a PCM audio signal, by high efficiency encoding using sub-band coding (SBC), adaptive transform coding (ATC) and adaptive bit allocation.

With the high efficiency encoder of the present embodiment, as shown in FIG. 1, a digital audio input signal supplied to the input terminal 10 is divided into frames at a predetermined time interval, and each frame is divided into plural frequency bands to form a set of blocks so as to divide the digital audio input signal in both time and frequency. Compression of the digital audio input signal is obtained using a bit allocation number adaptively determined for each of the blocks and high efficiency encoding is performed using the bit allocation numbers thus determined.

The encoder includes the adaptive bit allocation encoding circuits 16, 17, and 18 which divide the number of bits that may be employed for bit allocation among the blocks into a first portion that is allocated among the blocks in a manner that depends on the allowable noise spectrum associated with human aural characteristics (characteristics such as the masking effect, a minimum audibility curve or an equal-loudness curve), and a second portion that is allocated among the blocks in a manner that depends on the signal energies of the blocks.

In addition to allocating the total number of bits that may be employed for bit allocation among the blocks derived from the digital input signal, the adaptive bit allocation and encoding circuits 16 to 18 also allocate a number of bits for encoding subsidiary information. The subsidiary information includes the block floating coefficients employed for block floating, and word length information indicating the number of bits allocated to each block.

Block floating is an operation of multiplying the words in each of the blocks by a common value to increase the values of the words to improving the quantizing accuracy. Specifically, the maximum of the absolute values of the words in the block is found, and a common coefficient that is not saturated by the maximum absolute value is selected as the block floating coefficient.

The simplest way of performing block floating is 6 dB floating performed by bit shifting. Block floating is usually performed using the spectral components produced by transforming a frame of an audio signal corresponding to the above-mentioned predetermined time interval into the frequency domain.

In high-efficiency encoding in which the spectral components in each block processed by block-floating are quantized by adaptive bit allocation for transmission, respective signal energies are found for the blocks, and an allowable noise energy, which takes the masking effect into account, is found for each block based on the signal energies. In addition, the word lengths associated with the number of allocated bits are found from the allowable noise energy for each block and the block floating coefficient for the block floating applied to each block.

The block floating coefficient is obtained by multiplying the peak value or the mean value, for example, of the spectral components in each block by a predetermined coefficient. The word length corresponding to the bit allocation number is found on the basis of the allowable noise energies associated with the block-by-block signal energies of the spectral components.

It is also possible with the present embodiment of the high efficiency encoder to constitute the blocks by further dividing the output of, e.g., the SBC system, that is, by dividing in time the signals in the frequency ranges produced by division along the frequency axis without previous division along the time axis, orthogonally transforming the results, and encoding the spectral components.

That is, in the present embodiment of the high efficiency encoder shown in FIG. 1, a digital input signal, that is, a PCM audio input signal, is divided by a filter into plural frequency ranges and the signal in each frequency range is orthogonally transformed to produce spectral components which are grouped into critical bands for encoding by adaptive bit allocation. This takes the frequency resolution characteristics of the human auditory sense into account as will be explained below. The spectral components in the higher-frequency bands can be further divided into sub-bands. To simplify the present description, references herein to frequency bands will be taken also to encompass the sub-bands obtained by subdividing each of the critical bands. The non-time-block-forming frequency division into frequency ranges by, e.g., a filter, may be made so that the resulting frequency bands are of an equal bandwidth.

In the present embodiment, the block size subject to the orthogonal transform is adaptively changed before the orthogonal transform depending on the input signal, and block floating is applied to the frequency blocks obtained by further sub-dividing the critical bands.

A critical band means is a frequency band which takes the frequency resolution characteristics of the human auditory sense into account. A critical band is a frequency band of a narrow bandwidth in which noise in vicinity of the frequency of a pure sound is masked by the pure sound. The critical bands become broader the higher the frequency of the bands. The entire audio frequency range of 0 Hz to 20 kHz is divided into 25 critical bands.

Referring now to FIG. 1, an audio PCM signal in the frequency range of 0 Hz to 20 kHz is supplied to the input terminal 10. This input signal is divided by the frequency range division filter 11, which is preferably a QMF, into a frequency range of 0 Hz to 10 kHz and a frequency range signal in the frequency range of 10 to 20 kHz. The signal in the frequency range of 0 Hz to 10 kHz is additionally divided by the frequency range dividing filter 12, which is preferably a QMF, into a frequency range signal in the frequency range of 0 Hz to 5 kHz and a frequency range signal in the frequency range of 5 to 10 kHz. The frequency range signals in the frequency ranges of 10 to 20 kHz, 5 to 10 kHz and 0 Hz to 5 kHz from the frequency dividing filters 11 and 12 are supplied to the MDCT circuits 13, 14 and 15, as examples of orthogonal transform circuits, and the block size decision circuits 19, 20 and 21. The block size decision circuits 19 to 21 set the block size for the MDCT processing and the MDCT circuits 13 to 15 perform MDCT operations on the frequency range signals from the frequency range dividing filters 11 and 12 with the block size set by the block size decision circuits 19 to 21.

Figure 2:
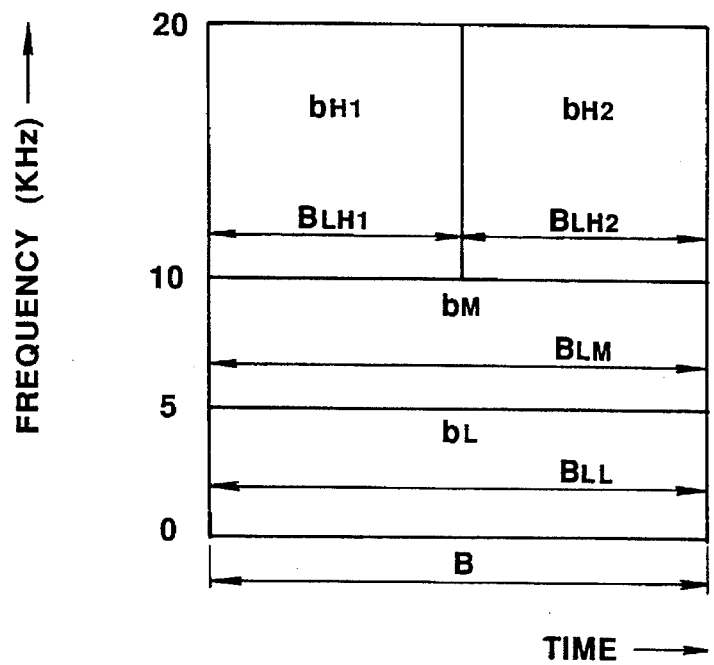
FIG. 2 is a diagrammatic view showing an example of the frequency and time division of signals by the encoder shown in FIG. 1.

FIG. 2 shows practical examples of the block sizes on which the processing by MDCT circuits 13 to 15 is performed. In the practical example shown in FIG. 2, the bandwidth of the frequency ranges increases towards the high frequency range and the block lengths in time decrease in the same direction to improve the temporal resolution towards higher frequencies. That is, for the frequency range signal in the low frequency range of 0 Hz to 5 kHz and in the middle frequency range of 5 to 10 kHz, the number of samples in the blocks $b_L$ and $b_M$ (i.e., the block lengths or block sizes) is set to, e.g., 256, whereas, for the frequency range signal in the high frequency range of 10 to 20 kHz, the block length is set to one-half the block lengths $B_{LL}$ and $B_{LM}$ of the low-range and middle-range blocks $b_L$ and $b_M$, that is, the block lengths $B_{LH1}$ and $B_{LH2}$ are set to $B_{LL}/2$ or $B_{LM}/2$.

In the present embodiment, the number of samples in each orthogonal transform block is selected to be equal in each frequency range. Also, the blocks in each frequency range in the present embodiment may be adaptively divided into two or four blocks when large temporal signal changes occur.

Returning now to FIG. 1, the spectral components (or MDCT coefficient data), obtained as a result of the MDCT processing by the MDCT circuits 13 to 15, are grouped into critical bands, and, in the case of the higher-frequency critical bands, into sub-bands and are fed to the adaptive bit allocation and encoding circuits 16, 17, and 18.

The adaptive bit allocation and encoding circuits 16, 17, and 18 requantize the spectral components or the MDCT coefficient data using the number of bits allocated to each critical band and sub-band. The practical arrangement of these adaptive bit allocation and encoding circuits 16 to 18 will be described below.

The encoded spectral components in each frequency range are fed to the output terminals 22, 24, and 26. The block floating information indicating the block floating coefficients used in normalizing and the word length information indicating the number of bits used for quantizing the spectral components in each critical band and sub-band are output with the encoded spectral coefficients.

Figure 3:
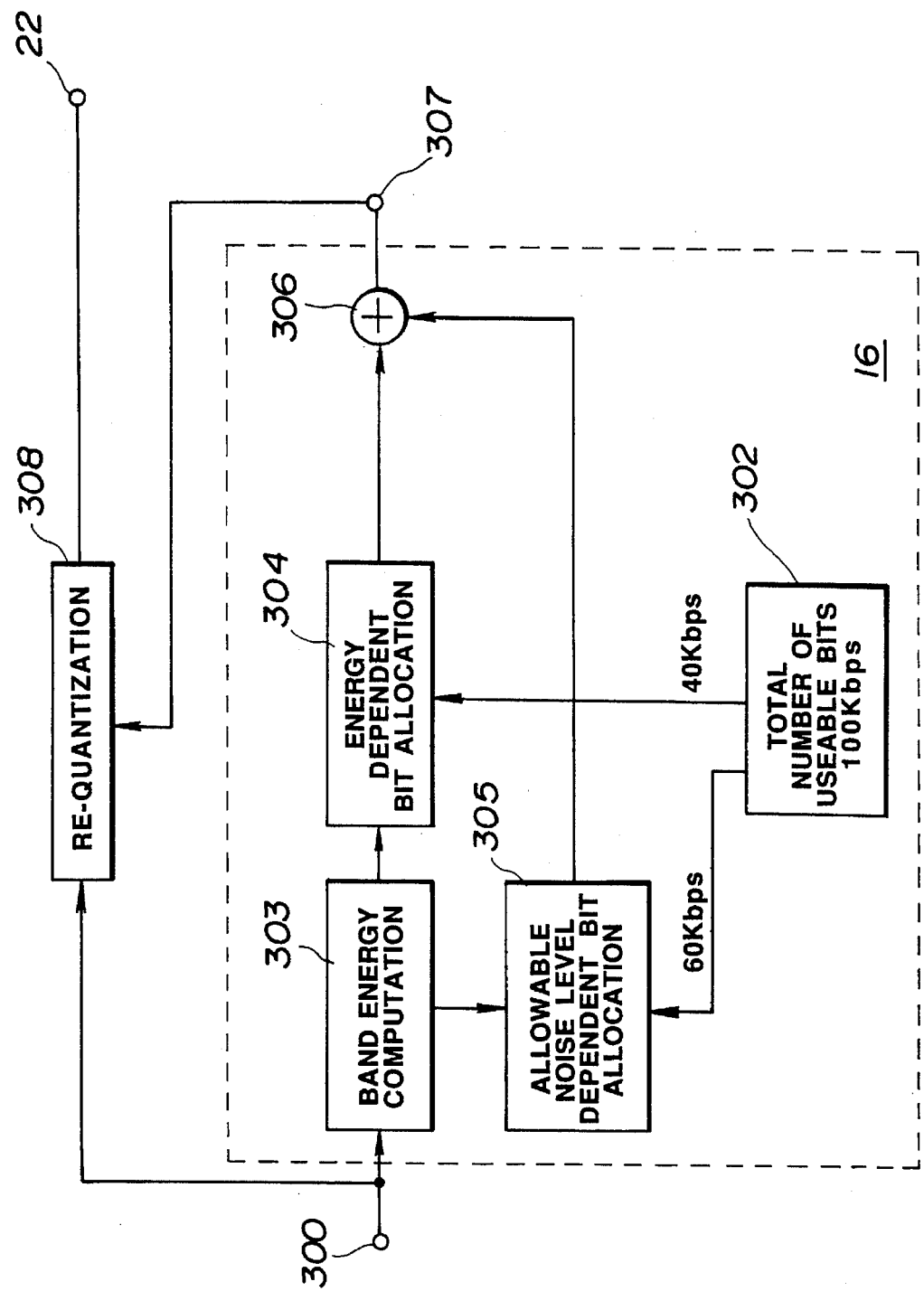
FIG. 3 is a block circuit diagram showing an example of the adaptive bit allocation and encoding circuit employed in encoder shown in FIG. 1.

Referring to FIG. 3, a practical example of the arrangement of the above-mentioned adaptive bit allocation and encoding circuit will now be described.

The spectral components from the MDCT circuits 13, 14 and 15 shown in FIG. 1 are supplied to the input terminal 300 of each of the adaptive bit allocation and encoding circuits 16, 17, and 18 shown in FIG. 3, and thence to the energy calculating circuit 303 for calculating band energies. FIG. 3 shows the adaptive bit allocation and encoding circuit 16 as an example of the adaptive bit allocation and encoding circuits 16 to 18.

The band energy calculating circuit 303 calculates the energy in each of the critical bands or critical sub-bands by calculating, e.g., the root-mean-square values of the amplitudes of the spectral coefficients in each of the bands or sub-bands. That is, the band energy calculating circuit 303 calculates the signal energy in each critical band or sub-band. Peak or mean values of the amplitudes of the spectral coefficients may also be employed in place of the signal energies, so that the term "signal energies" as used herein broadly indicates these signal characteristics.

Figure 4:
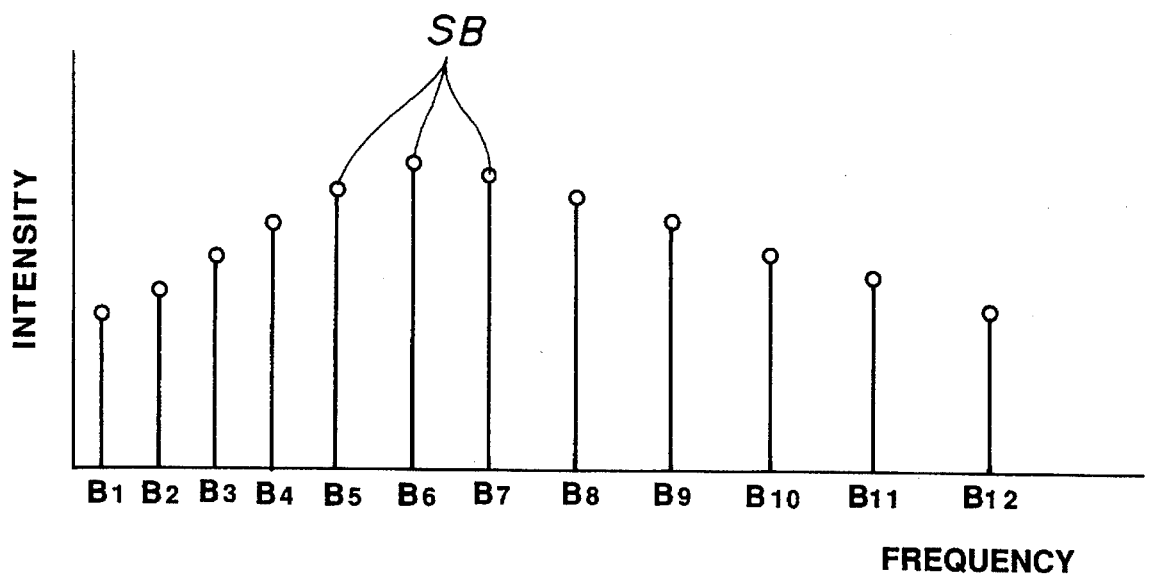
FIG. 4 is a graph showing a bark spectrum.

The spectrum of the sum of the signal energies in each critical band or sub-band, as calculated by the energy calculating circuit 303, is represented by the bark spectrum SB shown in FIG. 4. In FIG. 4, the critical bands or sub-bands are indicated by 12 bands B1 to B12 to simplify the drawing.

The energy values of the respective bands or sub-bands, as computed by the band energy calculating circuit 303, are supplied to the energy-dependent bit allocation circuit 304. The energy-dependent bit allocation circuit 304 executes bit allocation using 40 kbps from the total number of useable bits, 100 kbps, in the present embodiment. Bit allocation is performed so as to be proportional to logarithmic values of the band or sub-band energies so that the noise produced on quantizing using the allocated numbers of bits is white noise, which is less obtrusive to the listener. The total number of the useable bits is set in the total useable bit number outputting circuit 302. However, the total number of the useable bits may also be set externally.

The output of the energy calculating circuit 303 is transmitted to the allowable noise calculating circuit 305 which calculates the allowable noise level for each critical band based on the energy value of each of the critical bands taking into account the above-mentioned masking effect. The number of bits to be allocated to each of the critical bands is determined in dependence upon the allowable noise level and energy or the peak value in each critical. The number of bits used by the allowable noise calculating circuit 305 is 60 kbps of the total number of the useable bits of 100 kbps set by the total useable bit number setting circuit 302.

The allocated bit number output from the energy-dependent bit allocation circuit 304 and the allocated bit number output from the allowable noise calculating circuit 305 are transmitted to the total bit number calculating circuit 306. The total bit number calculating circuit 306 sums the allocated bit numbers, and feeds the resulting total bit number via the terminal 307 to the re-quantizing circuit 308 for re-quantizing the spectral components or MDCT coefficient data. The spectral coefficients requantized and encoded in this manner are then fed to the output terminals 22, 24, and 26 shown in FIG. 1.

The allowable noise calculating circuit 305 will now be described in detail with reference to FIG. 5 which shows, in a block circuit diagram, an illustrative practical example of the allowable noise calculating circuit 305 in the adaptive bit allocation and encoding circuits 16 to 18.

Figure 5:
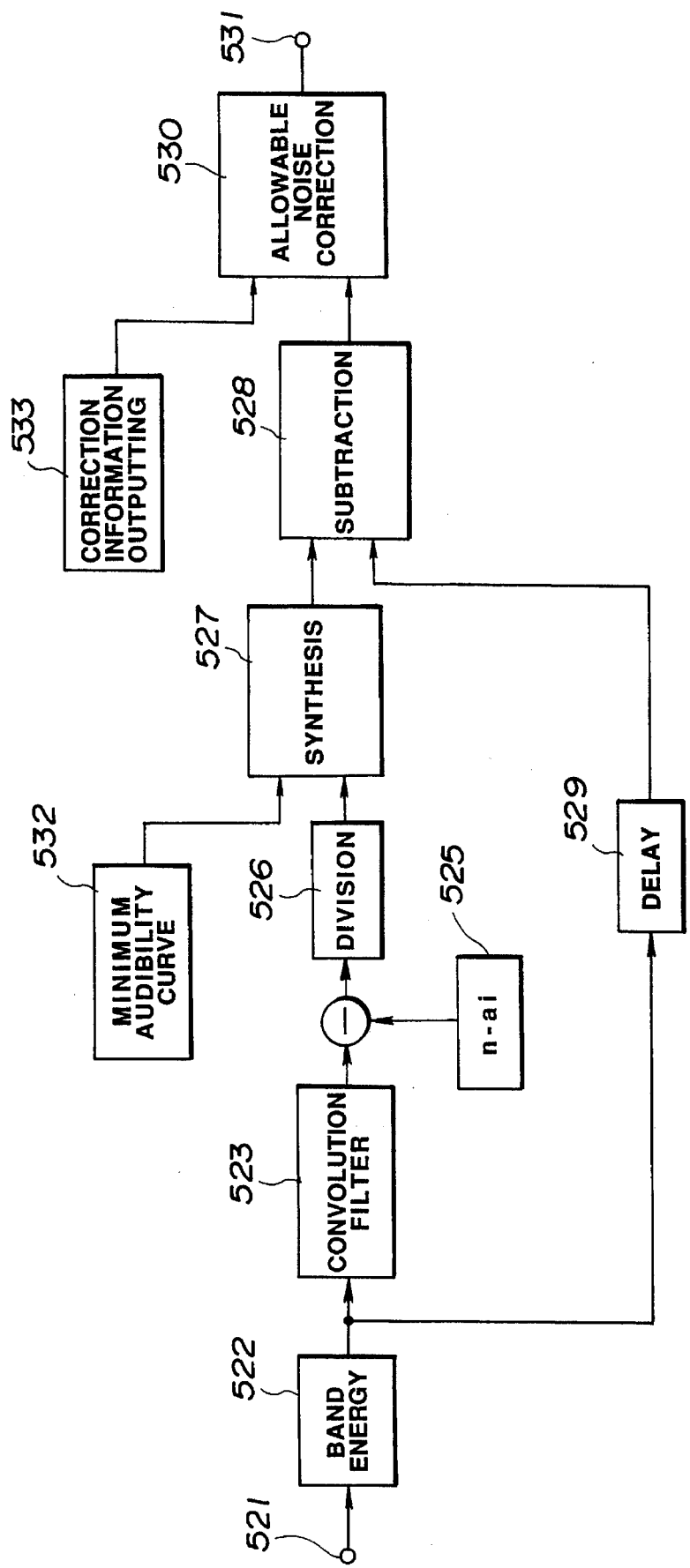
FIG. 5 is a block circuit diagram for illustrating the detailed construction of a circuit for calculating the allowable noise.

FIG. 5 shows, for ease of understanding, the components of the circuit shown in FIG. 3 from the input terminal 300 up to the energy calculating circuit 303. In FIG. 5, the input terminal 300 of FIG. 3 is indicated as the terminal 521 and the band energy calculating circuit 302 is indicated as the band energy calculating circuit 522.

In FIG. 5, spectral components from the MDCT circuits 13 to 15 are supplied via the input terminal to the band energy calculating circuit 522, where the signal energies are calculated by calculating the square sum values of the amplitudes of the spectral components in each critical band. The peak or mean values of the amplitudes of the spectral components may also be employed in place of the band energies, as mentioned above. The band energy calculating circuit 522 generates the bark spectrum SB as shown, for example, in FIG. 6, which shows only 12 critical bands (B1 to B12) to simplify the drawing.

To take account of the effect of the bark spectrum SB on masking, each value of the bark spectrum SB is multiplied by a predetermined weighting function and is summed to the other values to perform convolution. The output of the band energy calculating circuit 522, that is, each value of the bark spectrum, is transmitted to the convolution filter circuit 523. The convolution filter circuit 523 is made up of a plurality of delay elements for sequentially delaying the input data, a plurality of multipliers for multiplying the output of each delay element output by a weighting function, and an additive unit for calculating the sum of the multiplier outputs. The total sum value is calculated by such convolution.

The masking effect is one of the aural characteristics of the human aural sense, and is classified into temporal masking by audio signals in the time domain, and concurrent masking in the frequency domain. As a result of masking, any noise in the masking range of an audio signal is masked and is therefore imperceptible. Thus, any noise in the masking range of the signal is allowable noise.

A practical example of the weighting functions in the convolution filter 523 will now be given. When the coefficient of the multiplier M corresponding to an arbitrary band is 1, the outputs of the multipliers M−1, M−2, and M−3 are respectively multiplied by weighting functions of 0.15, 0.0019, and 0.0000086; and the outputs of the multipliers M+1, M+2, and M+3 are respectively multiplied by weighting functions of 0.4, 0.06, and 0.007. M is an arbitrary integer between 1 and 25.

The output of the convolution filter 523 is fed into the subtractor 524, which calculates a level $\alpha$ corresponding to the allowable noise level (which will be described later) in the above-mentioned convoluted region. The level $\alpha$ corresponding to the allowable noise level is the level that will become equal to the allowed noise level in each critical band after inverse convolution processing is carried out, as will be described below. The subtractor 524 is supplied with an allowed function representing the masking level for calculating the level $\alpha$. Increasing or decreasing the value of the allowed function controls the level $\alpha$. The allowed function is supplied by the (n−ai) function generator 525, as will be described next.

When the number of the band is i, the number of the lowest-frequency band being 1, the level $\alpha$ corresponding to the allowed noise level is calculated using the following formula 1:

$$\alpha = S - (n - ai) \quad \quad 1$$

In the formula 1, n and a are constants (a>0), and S is the intensity of the convolution-processed bark spectrum. In the formula 1, (n−ai) is the term indicating the allowed function. For example, n and a may be so set that n=38 and a=−0.5.

The level α found in this manner is transmitted to the divider 526 for deconvoluting the level a in the convoluted region. By such deconvolution, the masking threshold value may be found from the level α. Although deconvolution normally requires complex computation, deconvolution is performed in the present embodiment in a simplified fashion by using the divider 526.

Figure 6:
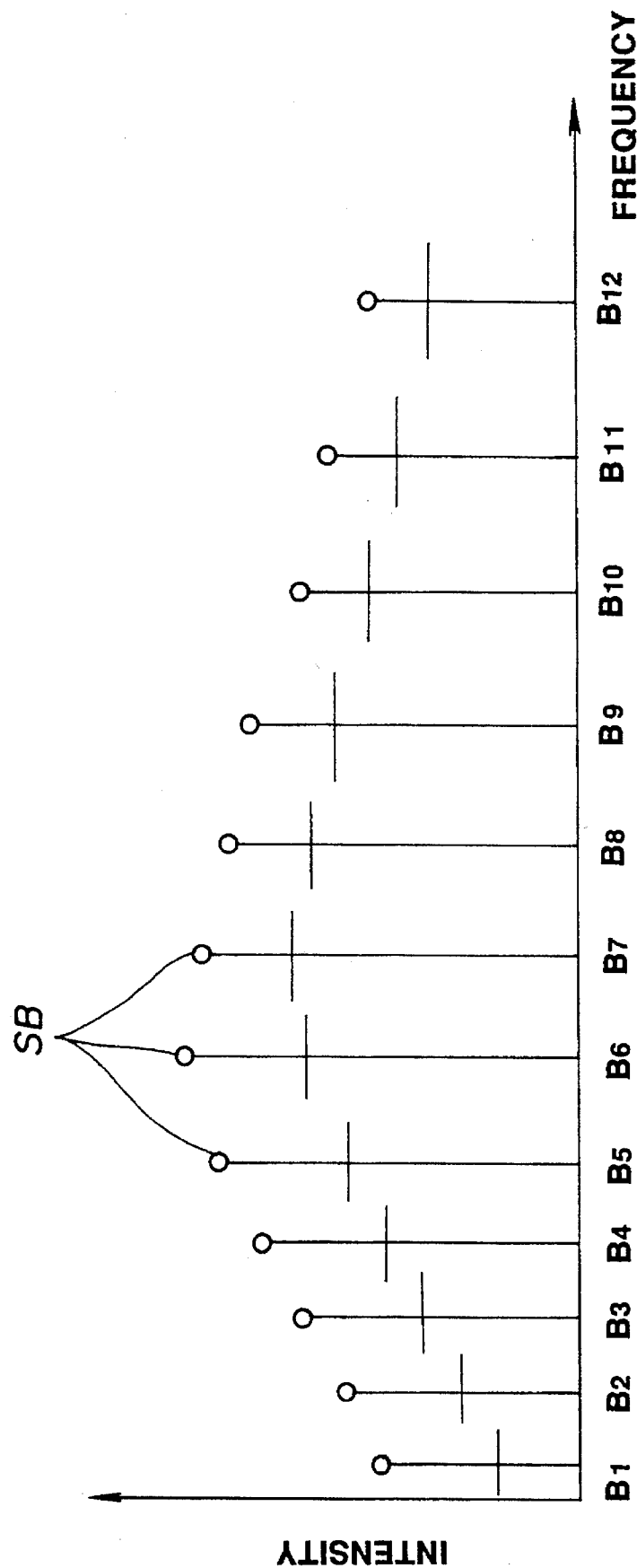
FIG. 6 is a graph showing a masking spectrum.

The masking threshold value is transmitted via the synthesis circuit 527 to the subtractor 528. The output of the band energy detection circuit 522, that is the above-mentioned bark spectrum SB, is supplied to the subtractor 528. The masking threshold is subtracted from the bark spectrum SB in the subtractor 528, so that, as shown in FIG. 6, the portion of the bark spectrum SB below the masking threshold is masked. The output of the subtractor 528 is fed to the allowable noise correction circuit 530 as will be described in more detail below.

The delay circuit 529 is provided to delay the bark spectrum from the energy detection circuit 522 to take account of the processing delays in the circuitry upstream of the synthesis circuit 527.

Figure 7:
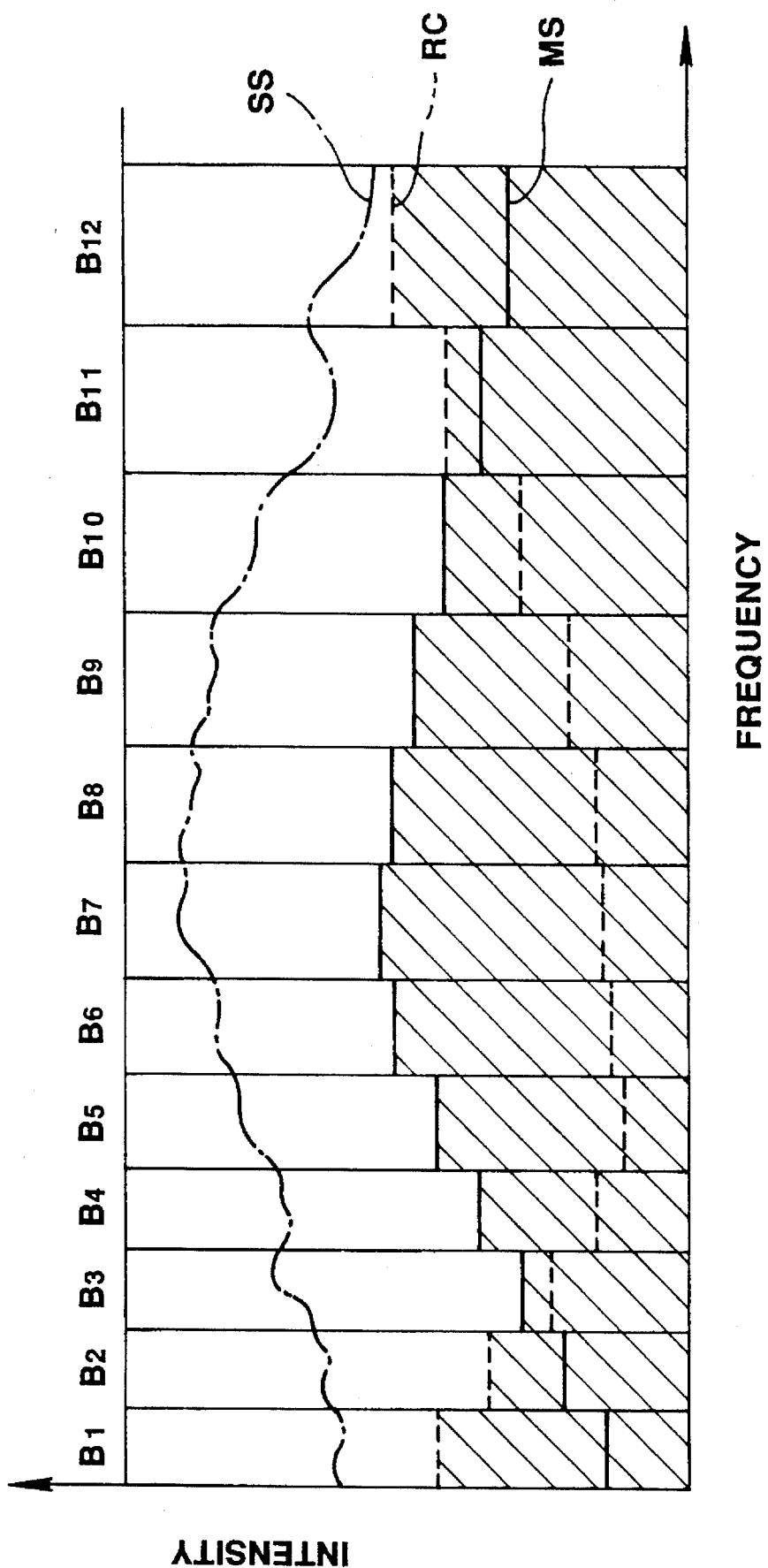
FIG. 7 is a graph showing a minimum audibility curve and a masking spectrum combined together.

Minimum audibility data from the minimum audibility curve generating circuit 532, which indicates another of the human aural characteristics and shown by the dotted line in FIG. 7, and the above-mentioned masking threshold MS, are synthesized in the synthesis circuit 27. Noise having an absolute value lower than the minimum audibility curve RC is imperceptible. The minimum audibility curve RC changes according to the reproduced sound volume, even though the same coding method is employed. However, in a practical digital system, since there is no marked difference in the manner in which music is fit into the 16-bit dynamic range, it may be surmised that, if the quantizing noise in the frequency range in the vicinity of 4 kHz, which is the frequency range at which the human aural sense is most sensitive, is inaudible, then quantizing noise below the level of the minimum audibility curve RC at other frequencies will also be inaudible. Consequently, if assumed that the system is used in such a manner that the noise corresponding to the minimum word length of the system is inaudible in the vicinity of 4 kHz, the allowable noise level may be produced by synthesizing the minimum audibility curve RC and the masking threshold MS. The allowable noise level in such case is that indicated by the dotted lines in FIG. 7. In the present embodiment, the 4 kHz level of the minimum audibility curve is set to the minimum level corresponding to the least-significant bit of a 20-bit system. In FIG. 7, the signal spectrum SS is also shown by the chain-dotted line curve.

The allowable noise correction circuit 530 corrects the allowable noise level at the output of the subtractor 528 based the information indicating the equal-loudness curve received from the correction information outputting circuit 533. The equal-loudness curve, also termed the equal loudness sensitivity curve, characterizes another of the characteristic of the human aural sense. It is a curve obtained by connecting the pressures of tones of respective frequencies that are perceived as having the same loudness as a pure tone at 1 kHz. According to the equal-loudness curve, for example, a sound in the vicinity of 4 kHz sounds as loud as a sound at 1 kHz sound having a sound pressure level about 8 to 10 dB higher. On the other hand, a sound at about 50 Hz must have a sound pressure level about 15 dB higher than the sound at 1 kHz to sound as loud.

Consequently, noise exceeding the level of the minimum audibility curve becomes allowable noise if such noise has frequency characteristics corresponding to the equal-loudness curve, so that such noise is not perceived by the human auditory sense.

It is seen from the above description that correction of the allowable noise level taking into account the equal-loudness curve is matched to the characteristics of the human aural sense. The spectral contour which depends on the above-mentioned allowable noise level, is formed by bit allocation using 60 kbps of the above-mentioned total number of useable bits of 100 kbps.

The output of the subtractor 528 is fed via the allowable noise correction circuit 530 to the output terminal 531, whence it is supplied to a memory, not shown, in which information indicating the bit allocation number, for example, for each of the bands is stored.

The memory outputs information indicating the bit allocation number bits for each band responsive to the output from the subtractor 528 via the allowable noise correction circuit 530, that is, the level difference between the energies of the bands and the respective allowable noise levels.

Using the bit allocation number information and the information from the energy-dependent bit allocation circuit 304 shown in FIG. 3, the requantizing circuit 308 in the adaptive bit allocation and encoding circuits 16 to 18 of FIG. 1 re-quantizes the spectral components from the MDCT circuits 13 to 15, using the number of bits allocated to each band.

In the above-described present embodiment, the ultimate bit allocation number for each band is the sum of the bit allocation number dependent on the band energies and the bit allocation number dependent on the allowable noise level. The manner of the bit allocation and the manner of input signal spectrum and quantizing noise associated therewith are shown in FIGS. 8 and 10 and in FIGS. 9 and 11, respectively.

Figure 8:
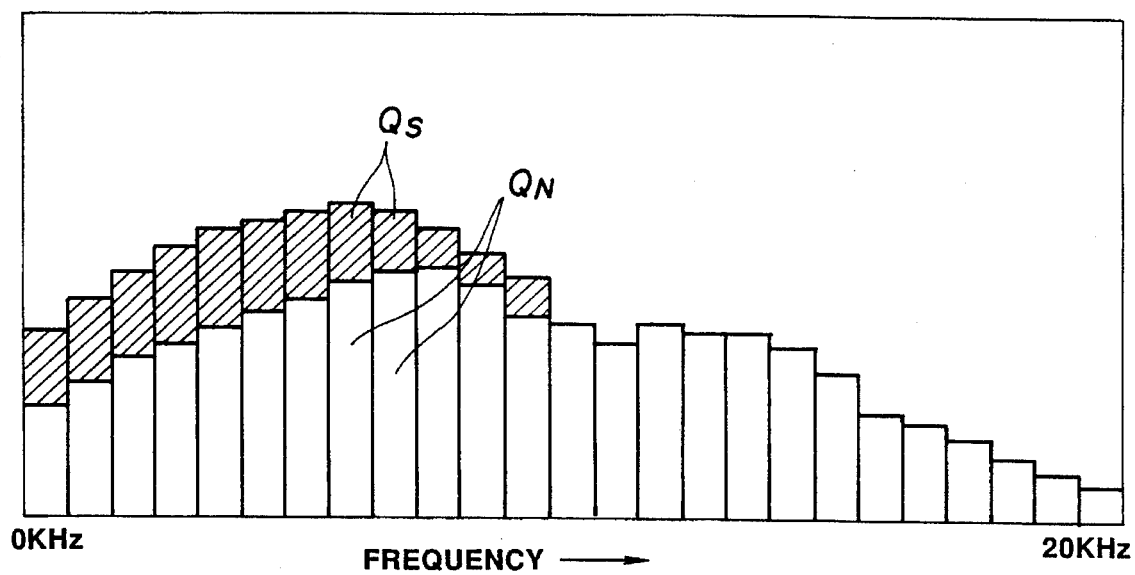
FIG. 8 is a graph showing an example of the bit allocation for a substantially flat spectral input.
Figure 9:
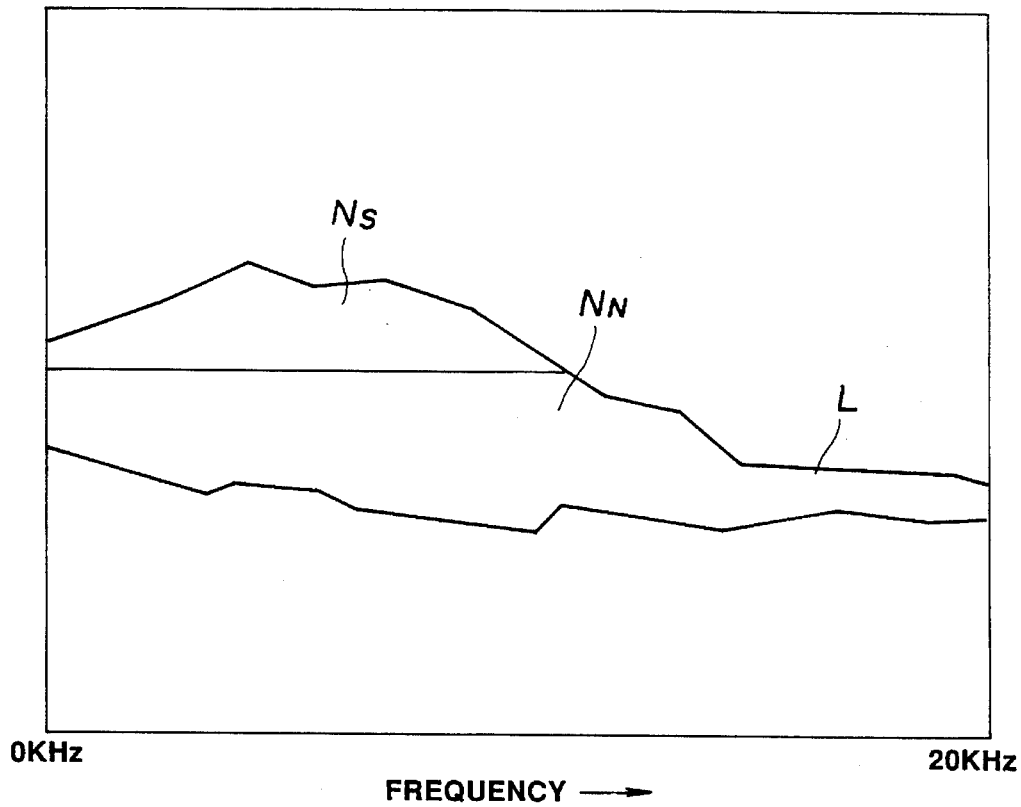
FIG. 9 is a graph showing an example of the input signal spectrum and the quantizing noise spectrum for a substantially flat spectral input.
Figure 10:
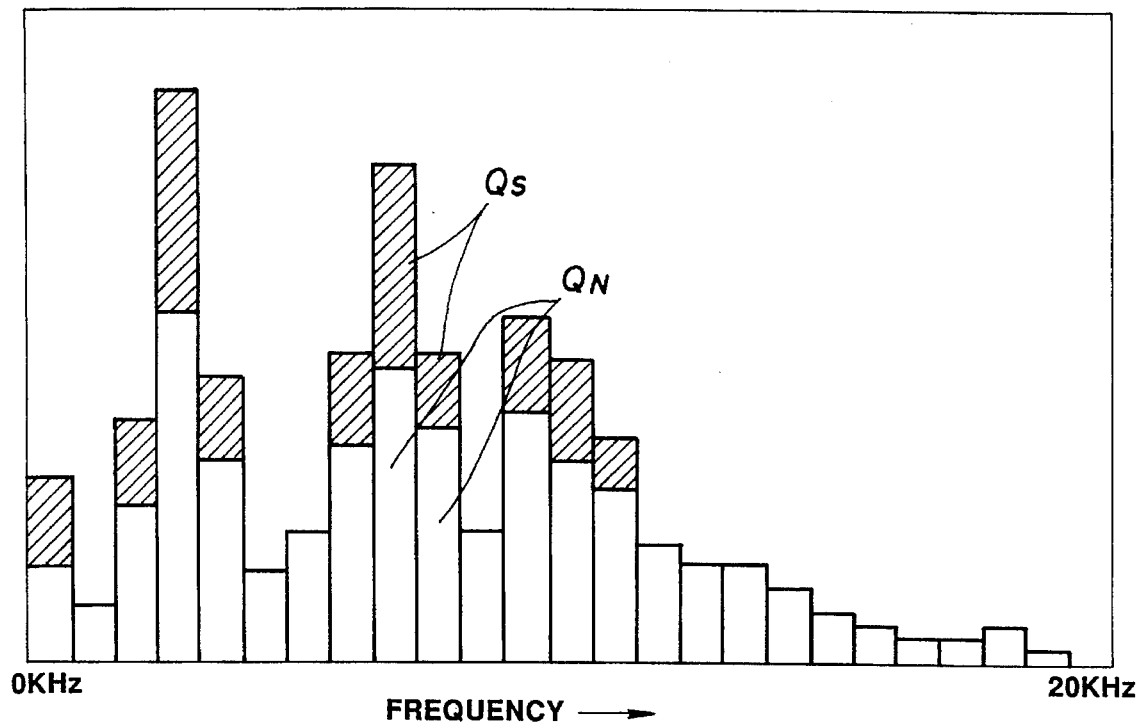
FIG. 10 is a graph showing an example of the bit allocation for a signal input exhibiting high tonality.

In FIGS. 8 and 9, the input signal has a flatter spectrum. In FIG. 8, the hatched area indicates the bit number allocated to the bands dependent upon the signal energies, while the unhatched area indicates the bit number allocated dependent upon the allowable noise level.

In FIG. 9, L indicates the signal level, while the area NS indicates the noise decrease due to the signal energy-dependent bit allocation and the area NN indicates the noise decrease due to the allowable noise level-dependent bit allocation.

It is seen from FIGS. 8 and 9 that the allowable noise level-dependent bit allocation is useful for realizing a high S/N ratio throughout the entire frequency range. However, in this case, smaller numbers of bits are allocated to the lower and higher frequency regions because noise in these frequency regions is less critical to the auditory sense. The signal energy-dependent bit allocation is mainly in the middle to low frequency region in which the signal levels are higher to produce less-obtrusive white noise.

Figure 11:
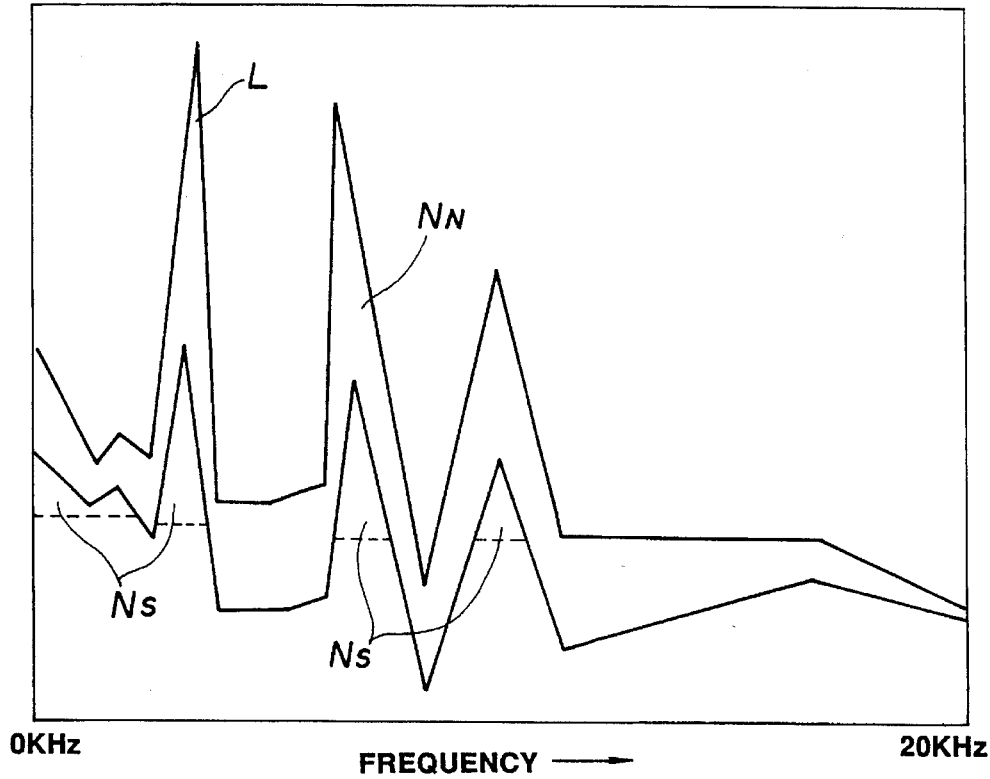
FIG. 11 is a graph showing an example of the input signal spectrum and the quantizing noise spectrum for a signal input exhibiting high tonality.

Conversely, if the input signal spectrum exhibits a high tonality, as shown in FIGS. 10 and 11, a decrease in the quantizing noise due to signal energy-dependent bit allocation is utilized for decreasing the noise within an extremely narrow frequency range. The allowable noise level-dependent bit allocation is less concentrated. By the sum of these noise decrease effects, solitary spectrum input signals may be improved in characteristics. In FIG. 10, hatched areas QS and unhatched areas QN indicate the signal energy-dependent bit number and the allowable noise level-dependent bit number, respectively. In FIG. 11, L, NS and NN indicate the signal level, the noise decrease due to signal energy-dependent bit allocation, and the noise decrease due to allowable noise level-dependent bit allocation, respectively.

In the present embodiment, an encoded signal, compressed using the above-mentioned allocated bit quantity, is transmitted or received over a transmission line or is recorded on or reproduced from a suitable recording medium, which may, for example, be a disc-shaped recording medium, such as an optical disc, magneto-optical disc, hard disc or a floppy disc. The recording medium may also be a tape-shaped recording medium, such as a magnetic tape or an optical tape, or a semiconductor memory.

Figure 12:
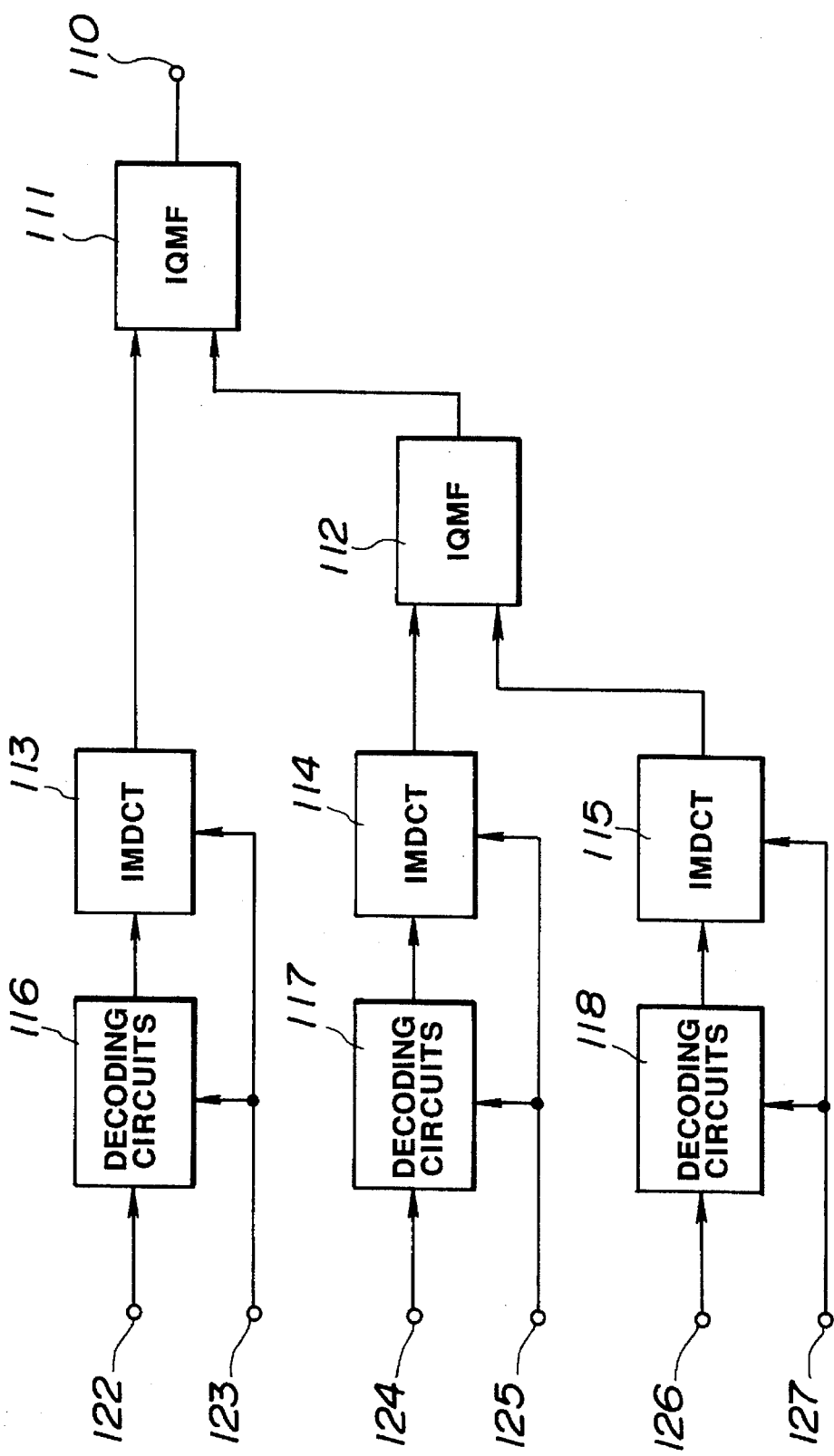
FIG. 12 is a block circuit diagram showing an example of a high efficiency decoding device embodying the present invention.

FIG. 12 shows the complementary expander, that is the decoder for decoding the signal encoded by high efficiency encoding by the above-described high efficiency encoder.

Referring to FIG. 12, the quantized MDCT coefficients in the respective frequency ranges are input to the input terminals 122, 124, and 126, while the corresponding block size and word length data are supplied to input terminals 123, 125, and 127. These input signals are supplied via the input terminals to the decoding circuits 116, 117, and 118, which release the bit allocation using the above-mentioned word length information.

Outputs of the decoding circuits 116 to 118 are transmitted to the IMDCT circuits 113, 114, and 115, respectively. The block size information is also supplied via the input terminals 123, 125, and 127 to the IMDCT circuits 113, 114, and 115, respectively. The time-domain signals for the frequency ranges from the IMDCT circuits 113 to 115 are synthesized to provide the time-domain signal for the entire frequency range by the IQMF circuits 112 and 111, whence they are transmitted to the output terminal 110.

In the decoder shown in FIG. 12, the encoded signal from the high-efficiency encoder may be decoded by a simple, small-sized decoder, while producing decoded signals with a high sound quality.

From the foregoing it is seen that the present invention provides a data compressor in which the total number of bits that may be used for bit allocation for the input digital signal is divided between a first number of bits which is allocated among the bands depending on the allowable noise spectrum based on aural characteristics and a second number of bits which is allocated among the bands depending on the signal intensities in the blocks obtained by subdividing the input audio signal in both time and frequency. Consequently, the noise level as perceived by the aural sense may be diminished with input audio signals exhibiting a wide spectral distribution, such as music signals. If the input signal has a spectrum having a large signal in one frequency range, such as a sine wave, the bit allocation may be concentrated in this range to improve the S/N ratio. With the bit allocation in accordance with the present invention, aurally desirable output signals may be produced, while, if the input signal is a lone spectrum signal, such as a 1 kHz sine wave, it becomes possible to produce satisfactory characteristics by a smaller quantity of computation without the necessity of adjusting the bit quantity repeatedly.

What is claimed is:

1. A bit allocation method for use in digital audio signal compression in which a digital audio signal is divided into frames at a predetermined time interval and each of the frames is divided into plural frequency bands to form a set of blocks so as to divide the digital audio signal in both time and frequency, and in which compression is performed using a bit allocation number determined for each of the blocks, the method comprising steps of:

dividing a total number of bits into at least two portions for bit allocation among the blocks in the set, the portions including a first portion and a second portion, each of the portions including at least one of the total number of bits;

allocating the bits of the first portion among the blocks dependent upon an allowable noise spectrum based on aural characteristics;

calculating respective signal intensities for the blocks;

allocating the bits of the second portion among the blocks dependent upon the respective signal intensities calculated in the calculating step; and combining the bits of the two portions together for each one of the blocks to determine the bit allocation number for the one of the blocks.

2. The method of claim 1, wherein the dividing step additionally divides the total number of bits into an additional portion, the bits divided into the additional portion being fixed in number and being for use to represent subsidiary information including block floating information and word length information.

3. The method of claim 1, wherein the step of allocating the bits of the first portion includes steps of:

calculating a masking threshold for each of the blocks, and providing a minimum audibility curve as ones of the aural characteristics;

synthesizing the masking threshold for each of the blocks and the minimum audible level curve to provide a synthesized result; and sharing the bits of the first portion among the blocks in response to the synthesized result.

4. The method of claim 3, wherein:

the step of allocating the bits of the first portion additionally includes steps of:

providing an equal-loudness curve as an additional one of the aural characteristics, and correcting the synthesized result according to the equal-loudness curve to provide a corrected synthesized result; and the step of sharing the bits of the first portion among the blocks is performed in response to the corrected synthesized result.

5. The method of claim 1, wherein:

each of the blocks includes spectral components, the spectral components having respective amplitudes; and the step of calculating the respective signal intensities for the blocks includes a step of calculating a root-mean-square value of the amplitudes of the spectral components in each of the blocks.

6. The method of claim 1, 2, or 3, wherein, in the dividing step, the total number of bits is divided into at least two portions for bit allocation among the blocks so that the first portion is larger than the second portion.

7. The method of claim 1, additionally comprising a step of dividing the digital audio signal to form the blocks by performing steps of:

dividing the digital audio signal by frequency into a low-range spectral portion, a mid-range spectral portion and a high-range spectral portion;

generating the frames by dividing the spectral portions at the predetermined time intervals of time; and further dividing the frames by frequency into the frequency bands, the frequency bands being coincident at least in part with critical bands.

8. A method of recording a digital audio signal as a compressed signal on a recording medium, the method comprising steps of:

dividing the digital audio signal into frames at a predetermined time interval;

dividing each of the frames into plural frequency bands to form a set of blocks;

generating the compressed signal by re-quantizing the blocks using bit allocation number determined for each of the blocks, the bit allocation number being determined by steps of:

providing a total number of bits that may be used for requantizing the set of blocks, dividing the total number of bits into at least two portions for allocation among the blocks, the portions including a first portion and a second portion, each of the portions including at least one of the total number of bits, allocating the bits of the first portion among the blocks dependent upon an allowable noise spectrum based on aural characteristics, calculating respective signal intensities for the blocks, allocating the bits of the second portion dependent upon the respective signal intensities calculated in the calculating step, and combining the bits of the two portions together for each one of the blocks to determine the bit allocation number for each one of the blocks; and recording the compressed signal on the recording medium.

9. The recording method of claim 8, wherein, the step of recording the compressed signal on the recording medium, the compressed signal is recorded on a disc as the recording medium.

10. The recording method of claim 9, wherein, in the step of recording the compressed signal on the recording medium, the disc on which the compressed signal is recorded is an optical disc.

11. A bit allocation encoder for use in digital audio signal compression in which the digital audio signal is divided into frames at a predetermined time interval, and each of the frames is divided into plural frequency bands to form a set of blocks so as to divide the digital audio signal in both time and frequency, and in which compression is performed using a bit allocation number determined for each of the blocks, the apparatus comprising:

means for dividing a total number of bits into at least two portions for bit allocation among the blocks in the set, the portions including a first portion and a second portion, each of the portions including at least one of the total number of bits;

means for allocating the bits of the first portion among the blocks dependent upon an allowable noise spectrum based on aural characteristics;

means for calculating respective signal intensities for the blocks;

means for allocating the bits of the second portion dependent upon the respective signal intensities calculated by the calculating means; and means for combining the bits of the two portions together for each one of the blocks to determine the bit allocation number for the one of the blocks.

12. The encoder of claim 11, wherein the aural characteristics are supplied from aural characteristics generating means at least including masking threshold generating means and minimum audibility curve generating means, the aural characteristics generating means combining an output of the masking threshold generating means and an output of the minimum audibility curve generating means to generate the aural characteristics.

13. The encoder of claim 12, wherein the aural characteristics generating means also include equal-loudness curve generating means for correcting the aural characteristics generated by combining the output of the masking threshold generating means and the output of the minimum audibility curve generating means.

14. The encoder of claim 11, additionally comprising means for encoding subsidiary information including block floating information and word length information using a set number of bits.

15. The encoder of claim 11, wherein the aural characteristics are composed of at least a masking threshold and a minimum audibility curve.

16. The encoder of claim 11, wherein the aural characteristics are composed of at least a masking threshold and a minimum audibility curve and corrected by an equal-loudness curve.

17. The encoder of claim 11, wherein the means for calculating the respective signal intensities for the blocks calculates a root-mean-square value of amplitudes in each of the blocks.

18. The encoder of claim 11, wherein the means for dividing divides the total number of bits so that the first portion is larger than the second portion.

19. The encoder of claim 11, wherein the blocks are obtained by dividing the digital audio signal into a low-range spectral portion, a mid-range spectral portion and a high-range spectral portion, by dividing the spectral portions in time into the frames, and by dividing the spectral portions in frequency into frequency bands at least in part coincident with critical bands.

* * * * *